(No Model.) 2 Sheets—Sheet 1.

J. DECKER.
GRAINING MACHINE.

No. 312,260. Patented Feb. 17, 1885.

WITNESSES
N. W. Mortimer
E. G. Siggers

INVENTOR
John Decker
by C. A. Snow & Co.
Attorneys

N. PETERS, Photo-Lithographer, Washington, D. C.

(No Model.) 2 Sheets—Sheet 2.

J. DECKER.
GRAINING MACHINE.

No. 312,260. Patented Feb. 17, 1885.

WITNESSES
N. W. Mortimer
E. G. Siggers

John Decker
INVENTOR
by C. A. Snow & Co
Attorneys

UNITED STATES PATENT OFFICE.

JOHN DECKER, OF NASHVILLE, TENNESSEE.

GRAINING-MACHINE.

SPECIFICATION forming part of Letters Patent No. 312,260, dated February 17, 1885.

Application filed August 7, 1884. (No model.)

*To all whom it may concern:*

Be it known that I, JOHN DECKER, a citizen of the United States, residing at Nashville, in the county of Davidson and State of Tennessee, have invented a new and useful Improvement in Automatic Feeders for Graining-Machines, of which the following is a specification, reference being had to the accompanying drawings.

My invention has relation to automatic feeders for graining-machines; and it has for its objects to produce a machine of the class referred to that shall be simple in construction and efficient in operation; and the invention consists in the construction and novel arrangement of parts, as will be hereinafter fully described, and particularly pointed out in the claims.

Figure 1:
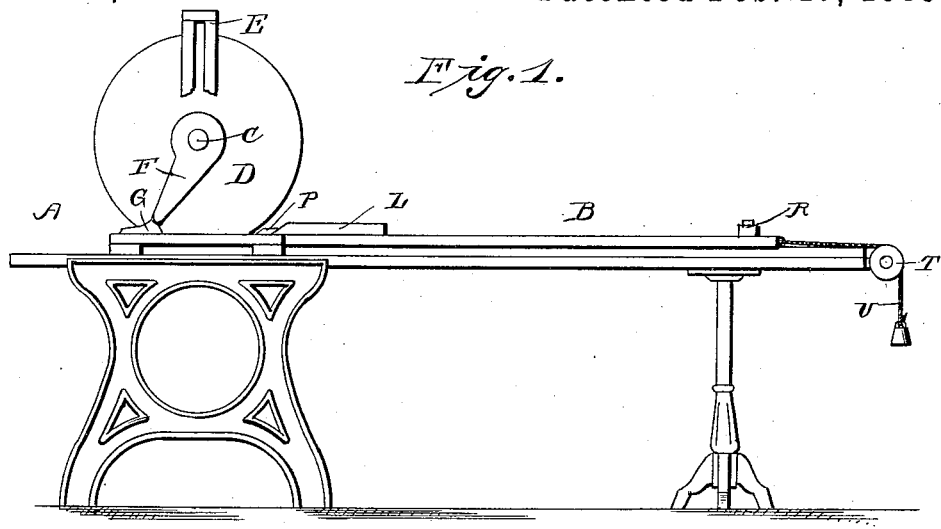
Figure 2:
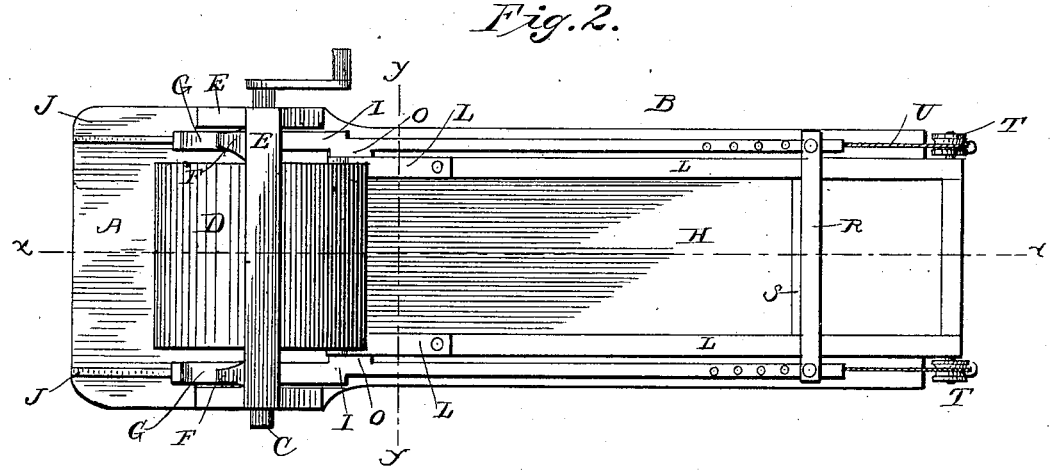
Figure 3:
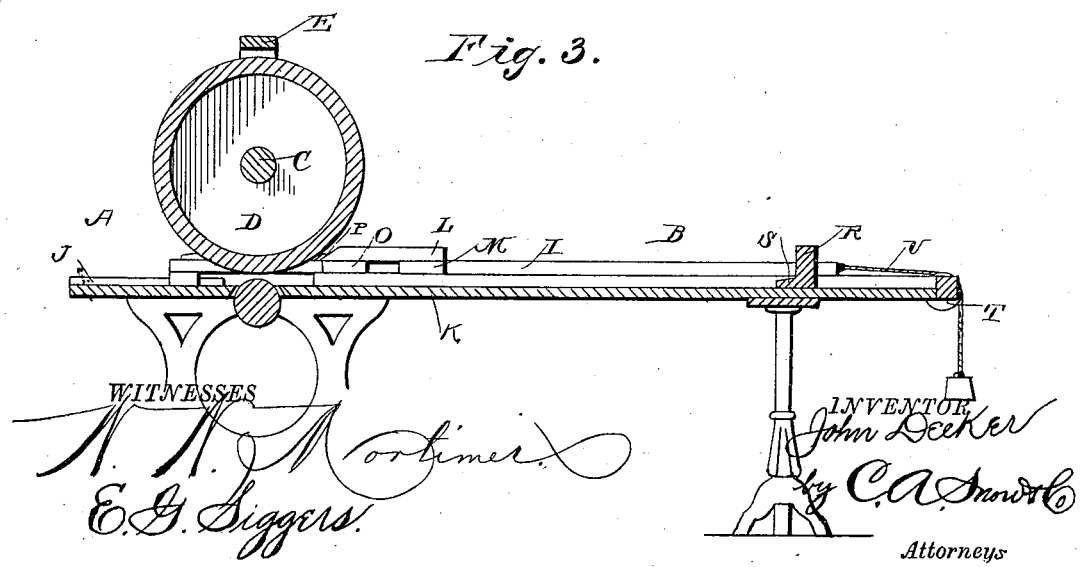
Figure 4:
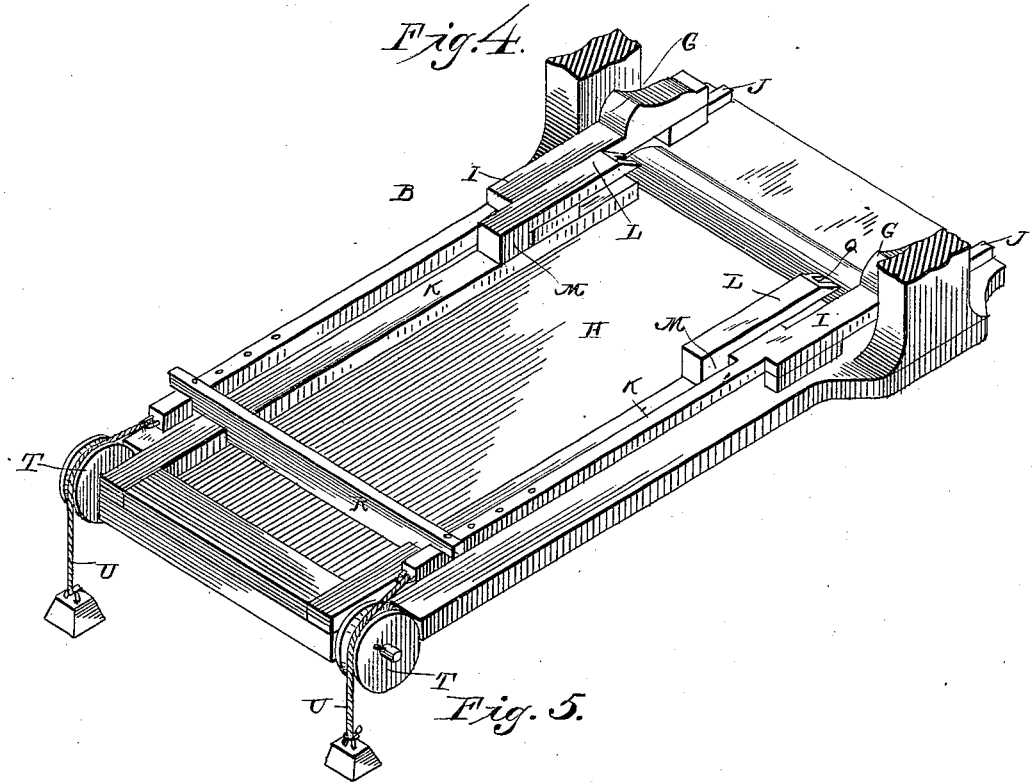
Figure 5:
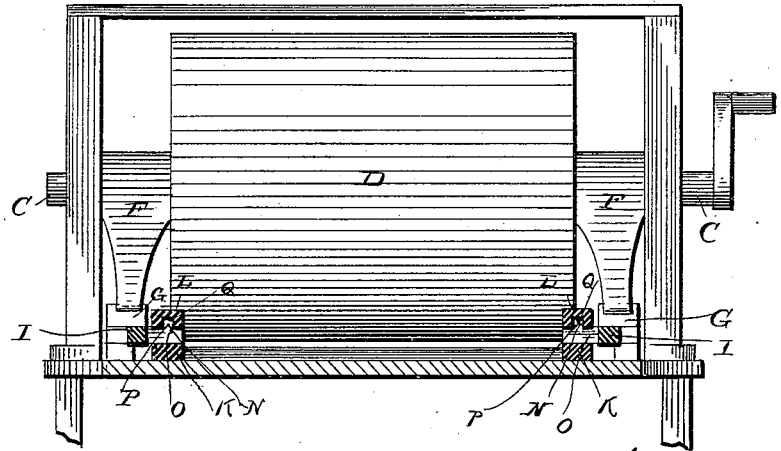

In the drawings, Figure 1 is a side elevation of a graining-machine with my improved feeder attached. Fig. 2 is a plan view. Fig. 3 is a vertical longitudinal section on the line $x\,x$, Fig. 2; and Fig. 4 is a perspective view of the feeder, the drum being removed. Fig. 5 is a vertical transverse sectional view on line $y\,y$, Fig. 2.

Referring by letter to the accompanying drawings, A designates a graining-machine of the ordinary construction, to which a feeder-table, B, is connected. The shaft C of the drum of the graining-machine is provided at the ends of the drum D and within the frame E with cams F F, which strike projections G G on the side rails, I, of the feeder H near the forward ends of said side rails when the drum is revolved and automatically operate the feeder.

J J designate the short track-rails on the feeder-table, which serve as guides for the forward ends of the side rails, I, of the feeder.

K K are the fixed side rails of the feeder, which are provided near their forward ends with raised guide-rails L L, secured near their rear ends upon stops M M, and grooved in their under faces from the stops to their forward ends, as shown at N, Fig. 5. The stops M M are made either integral with or separate from the grooved rails L L.

The movable side rails, I I, are provided in front of the stops M M with lateral projections O O, which extend inwardly under the guide-rails L L, and are provided with tongues P, which fit and work in the grooves Q of the rails L L. In rear of the stops M M the movable rails I I are connected by a transverse carrier, R, which is provided with a forwardly-projecting flange, S, at its lower face between the fixed side rails, K K. This carrier R is adjustable on the movable side rails, so that panels from fifteen inches to six feet can be grained. The forward end of the panel rests on the feed-table, and the rear end of the panel rests on the flange S of the carrier and bears against front face of the carrier. At the feed end of the feeder-table are provided two pulleys, T T, over which the weighted ropes or chains U, which are attached to the ends of the movable side rails, I I, run, and operate to draw the feeder back after it has been moved forward by the cams F F on the drum-shaft engaging the projections G G on the side rails, I I, and releasing them.

By attaching the feeder to the graining-machine the machine can be run by steam, while it has now to be run by hand-power.

The feeder can be attached to any graining-machine, and will increase the capacity of the machine more than one-half, and the work is better done than by hand-power. By actual test I have grained ten thousand panels in one day with this feeder attachment, so that its utility is obvious.

Having thus fully described my invention, what I claim as new, and desire to secure by Letters Patent of the United States, is—

1. The combination, with a graining-machine provided with cams on its drum-shaft, of the feeder-table provided with stationary side rails having grooved guide-rails, stops, track-rails, and pulleys, the movable side rails provided with projections and connected by the flanged carrier, and the weights connected by ropes to the movable side rails, substantially as specified.

2. The combination, with a graining-machine provided with cams on its drum-shaft, of the feeder-table provided with stationary side rails having raised, grooved guide-rails and stops, the movable side rails having lateral projections with tongues fitting the grooves of the guide-rails, projections on the movable rails, the adjustable flanged carrier connecting the movable rails, and the ropes and weights connected to the movable rails, substantially as specified.

In testimony that I claim the foregoing as my own I have hereto affixed my signature in presence of two witnesses.

JOHN DECKER.

Witnesses:
TIM DODSON,
M. R. PRIEST.